United States Patent
Coleman et al.

(10) Patent No.: US 6,453,893 B1
(45) Date of Patent: Sep. 24, 2002

(54) INTAKE AIR SEPARATION SYSTEM FOR AN INTERNAL COMBUSTION ENGINE

(75) Inventors: Gerald N. Coleman, Peoria; Charles H. Dutart, Washington; Eric C. Fluga, Dunlap, all of IL (US)

(73) Assignee: Caterpillar Inc, Peoria, IL (US)

(*) Notice: Subject to any disclaimer, the term of this patent is extended or adjusted under 35 U.S.C. 154(b) by 0 days.

(21) Appl. No.: 09/593,844

(22) Filed: Jun. 14, 2000

(51) Int. Cl.⁷ ................................................ F02B 23/00
(52) U.S. Cl. .......................................... 123/585; 60/274
(58) Field of Search ............................... 123/585; 60/274

(56) References Cited

U.S. PATENT DOCUMENTS

| | | |
|---|---|---|
| 2,444,222 A | 6/1948 | Craig |
| 3,489,144 A | 1/1970 | Dibelius et al. |
| 3,509,694 A | 5/1970 | Imai et al. |
| 3,602,202 A | 8/1971 | Kobayashi |
| 3,709,203 A | 1/1973 | Cettin et al. |
| 3,792,690 A | 2/1974 | Cooper |
| 3,817,232 A | 6/1974 | Nakajima et al. |
| 3,907,657 A | 9/1975 | Heijne et al. |
| 3,961,609 A | 6/1976 | Gerry |
| 3,977,365 A | 8/1976 | Vierling et al. |
| 3,980,053 A | 9/1976 | Horvath |
| 4,064,840 A | 12/1977 | Vierling |
| 4,351,302 A | 9/1982 | Brettler |
| 4,361,474 A | 11/1982 | Shoaf et al. |
| 4,553,988 A | 11/1985 | Shimizu et al. |
| 4,844,719 A | 7/1989 | Toyomoto et al. |
| 5,051,113 A | 9/1991 | Nemser |
| 5,051,114 A | 9/1991 | Nemser et al. |
| 5,129,924 A | 7/1992 | Schultz |
| 5,400,746 A | 3/1995 | Susa et al. |
| 5,476,537 A | 12/1995 | Yi et al. |
| 5,517,978 A | 5/1996 | Yi |
| 5,526,641 A | 6/1996 | Sekar et al. |
| 5,553,591 A | 9/1996 | Yi |
| 5,640,845 A | 6/1997 | Ng et al. |
| 5,648,304 A | 7/1997 | Mazanec et al. |
| 5,649,517 A | 7/1997 | Poola et al. |
| 5,678,526 A | 10/1997 | Cullen et al. |
| 5,702,999 A | 12/1997 | Mazanec et al. |
| 5,718,194 A | 2/1998 | Binion |
| 5,761,903 A | 6/1998 | Straka |
| 5,788,748 A | 8/1998 | Mazanec et al. |
| 5,960,777 A | * 10/1999 | Nemser et al. ............. 123/585 |

FOREIGN PATENT DOCUMENTS

JP     1-294953     * 11/1989

OTHER PUBLICATIONS

Membrane–Based Air Composition Control for Light–Duty Diesel Vehicles: A Benefit and Cost Assessment: Center for Transportation Research Arogonne National Laboratory; K. Stork and R. Poola, Oct. 1998.

* cited by examiner

*Primary Examiner*—Noah P. Kamen
(74) *Attorney, Agent, or Firm*—Todd T Taylor

(57) ABSTRACT

A method and system for the intake air separation within an internal combustion engine is disclosed. The disclosed embodiments of the intake air separation system include an intake air inlet adapted to receive substantially all of the intake air used in the combustion process for the engine and an intake air separation device in flow communication with the intake air inlet and adapted for separating substantially all of the intake air into a flow of the oxygen enriched air and a flow of nitrogen enriched air. The intake air separation system further includes a first outlet in fluid communication with the intake air separation device and adapted to receive a flow of the oxygen enriched air as well as a second outlet also in fluid communication with the intake air separation device and adapted to provide the flow of nitrogen enriched air to the intake manifold for use in the combustion process.

13 Claims, 5 Drawing Sheets

INTAKE AIR SEPARATION SYSTEM FOR AN INTERNAL COMBUSTION ENGINE

TECHNICAL FIELD

The present invention relates an intake air separation system for an internal combustion engine and more particularly, an intake air separation system that includes an air separation membrane adapted to produce a stream of oxygen enriched air and nitrogen enriched air from the intake air for use in a heavy duty diesel engine.

BACKGROUND ART

In recent years, internal combustion engine makers, and in particular diesel engine manufacturers, have been faced with ever increasing regulatory requirements, namely exhaust emissions regulations. Exhaust emissions takes on a number of forms including visible smoke, particulate matter and oxides of nitrogen (NOx). As is generally know in the art, particulate matter is comprised of mainly unburned hydrocarbons and soot whereas NOx is an uncertain mixture of oxides of nitrogen (mainly NO and some $NO_2$). To address these emissions issues, different technologies have been developed or used, including fuel injection and combustion control strategies and systems, after-treatment systems, exhaust gas recirculation (EGR) systems, and, in some cases intake air separation systems.

Many emission reduction systems have a negative effect on fuel efficiency, an issue that is of great importance to most users of diesel engines. One well-known method of improving engine fuel efficiency or power density is by increasing the amount of oxygen in the cylinder. Typically this has been accomplished by pressurizing the air taken into the combustion chamber. The main goal of this pressurization is to increase the oxygen available for combustion. Others have increased the concentration of oxygen in the combustion air using air separation techniques. See, for example, U.S. Pat. No. 5,649,517 (Poola et al.) issued on Jul. 22, 1997 and U.S. Pat. No. 5,636,619 (Poola et al.) issued on June 10, 1997 which disclose the use of a semi-permeable gas membrane on a portion of the intake air to reduce the nitrogen content from the intake air flow to create an oxygen enriched air supply for combustion purposes. The '517 patent also discloses potential uses for the nitrogen enriched air stream exiting the air separation device. Another related art disclosure of interest is U.S. Pat. No. 5,553,591 (Yi) issued to on Sept. 10, 1996 which shows a vortex air separation system for creating oxygen enriched intake air to increase the power generated during combustion. Still other related art systems employing oxygen enrichment are disclosed in U.S. Pat. No. 5,400,746 (Susa et al.) issued on Mar. 28, 1995 and U.S. Pat. No. 5,678,526 issued on Oct. 21, 1997. See also U.S. Pat. Nos. 5,051,113 and 5,051,114 (Nemser et al.)

It is well known that the introduction of oxygen enriched intake air during the intake stroke of facilitates burning a larger part of the available fuel injected which in turn increases the power output for each combustion cycle or charge, and generally reduces brake specific fuel consumption (BSFC). Lower BSFC correlates strongly with reduction in unburned fuel and overall improvement in fuel economy.

Other related art disclosures include U.S. Pat. No. 5,526,641 (Sekar et al.) and U.S. Pat. No. 5,640,845 (Ng et al.) which disclose similar air separation techniques for creating oxygen enriched air as well as nitrogen enriched air specifically for after-treatment purposes. Utilization of an air separation system has also been tried for the purpose of reducing emissions such as particulates and NOx. See K. Stork and R. Poola publication "Membrane-Based Air Composition Control for Light Duty Diesel Vehicles" (Oct.19998). Most particulates generated during the combustion cycle form relatively early in the combustion cycle, but such early forming particulates usually burn as temperature and pressure increase during the combustion cycle. The particulates that typically enter the exhaust stream tend to form in the latter part of the combustion cycle as the pressure and temperature decreases. In addition to decreasing BSFC, increasing air intake oxygen content serves to reduce the quantity of unburned hydrocarbons by increasing the likelihood of complete combustion.

After-treatment of exhaust gas is useful in reducing the amount of unburned hydrocarbons. After-treatment methods take steps to continue the oxidation of the unburned hydrocarbons. One manner is by introducing a secondary air supply into the exhaust stream. This secondary air stream provides more oxygen to the already high temperature exhaust ensuring further oxidation. While using secondary air is effective in eliminating particulates, the further oxidation creates still higher temperatures in the exhaust system. Designing the exhaust system for these higher temperatures requires components able to withstand the hotter environment. These components often times are heavier, expensive or require more frequent servicing.

While particulate production generally decreases along with fuel consumption, NOx production generally increases. NOx forms where nitrogen mixes in a high temperature setting with excess oxygen not used in the combustion process. Thus, while excess oxygen and high combustion temperatures are beneficial in reducing fuel consumption, such combination is detrimental in terms of increased NOx formation. This conflict generally leads engine manufacturers to delicately balance NOx production with brake specific fuel consumption (BSFC) and particulate matter in order to meet emission regulations. The present invention resolves, at least in part, the continuing conflict between reducing particulates, reducing NOx, and decreasing BSFC.

Exhaust Gas Recirculation (EGR) is one technique currently in use to reduce NOx formation within the combustion cylinder. EGR reduces the amount of available oxygen for formation of NOx. By reducing the amount of oxygen, the combustion process is also slowed thereby reducing the peak temperatures in the combustion chamber. EGR systems typically use exhaust gas, however the '517 patent (Poola et al.) shows using an enriched nitrogen source extracted from a portion of the intake air instead of recirculated exhaust gas to displace oxygen in the combustion chamber. See also K. Stork and R. Poola publication "Membrane-Based Air Composition Control for Light Duty Diesel Vehicles"(Oct. 19998). The enriched nitrogen air is both cleaner and cooler than exhaust gas, and thus provides distinct advantages over exhaust gas.

From the above discussion it appears well known that oxygen enriched air and nitrogen enriched air have a number of beneficial uses within an internal combustion engine and a diesel engine in particular. What is needed therefor are various improvements to the existing air separation systems so that such systems are useful in a heavy-duty diesel engine or similar such application. More importantly, what is needed are improvements to such existing air separation systems that provide reliable and durable designs of an intake air separation system and that effectively balances the fuel consumption requirements and emissions. Such a system should be simple and relatively inexpensive to manufacture, install, operate and maintain. The present invention is directed at overcoming one or more of the problems set forth above.

DISCLOSURE OF THE INVENTION

The present invention may be characterized as a method and system for intake air separation within an internal combustion engine. The intake air separation system includes an intake air inlet adapted to receive substantially all of the intake air used in the combustion process for the engine and an intake air separation device in flow communication with the intake air inlet. The intake air separation device, preferably an air separation membrane, is adapted for separating substantially all of the intake air into a flow of the oxygen enriched air and a flow of nitrogen enriched air. In addition, the intake air separation system includes a first outlet in fluid communication with the intake air separation device and adapted to receive the permeate flow of the oxygen enriched air as well as a second outlet adapted to provide the retentate flow of the nitrogen enriched air to the intake manifold for use in the combustion process. The air separation system further includes a flow control device disposed proximate the permeate outlet and adapted for controlling both air flows exiting from the intake air separation device and an engine control module operatively coupled to the flow control device for controlling the air flows exiting the separation device and ultimately the nitrogen content of said air provided to the intake manifold.

The invention may also be characterized as a method of controlling the intake airflow in an internal combustion engine. The method preferably comprises the steps of: (a) directing substantially all of the intake air to an intake air separating device; (b) separating the intake air into a flow of oxygen enriched air and a flow of nitrogen enriched air; (c) directing the nitrogen enriched air to the intake manifold of the engine; and (d) controlling the nitrogen content of the air directed to the intake manifold by controlling the flow of the oxygen enriched air in response to selected engine operating conditions. As with the above-described intake air separating system, the preferred method of controlling the intake airflow in an engine involves passing substantially all of the intake air through a selectively permeable membrane adapted for separating the intake air and producing controlled flows of oxygen enriched air at a first outlet and nitrogen enriched air at a second outlet.

BRIEF DESCRIPTION of the DRAWINGS

The above and other aspects, features and advantages of the present invention will be more apparent from the following more particular description thereof, presented in conjunction with the following drawings. Certain features and elements illustrated in the drawings may be repositioned and certain dimensions and relative sizes may be exaggerated to better explain the invention.

Corresponding reference numbers indicate corresponding components in the various embodiments illustrated in the drawings.

BEST MODE FOR CARRYING OUT THE INVENTION

The following description includes the best mode presently contemplated for carrying out the invention. This description is not to be taken in a limiting sense but is made merely for the purpose of describing the general principals of the invention. The scope and breadth of the invention should be determined with reference to the claims.

Figure 1:
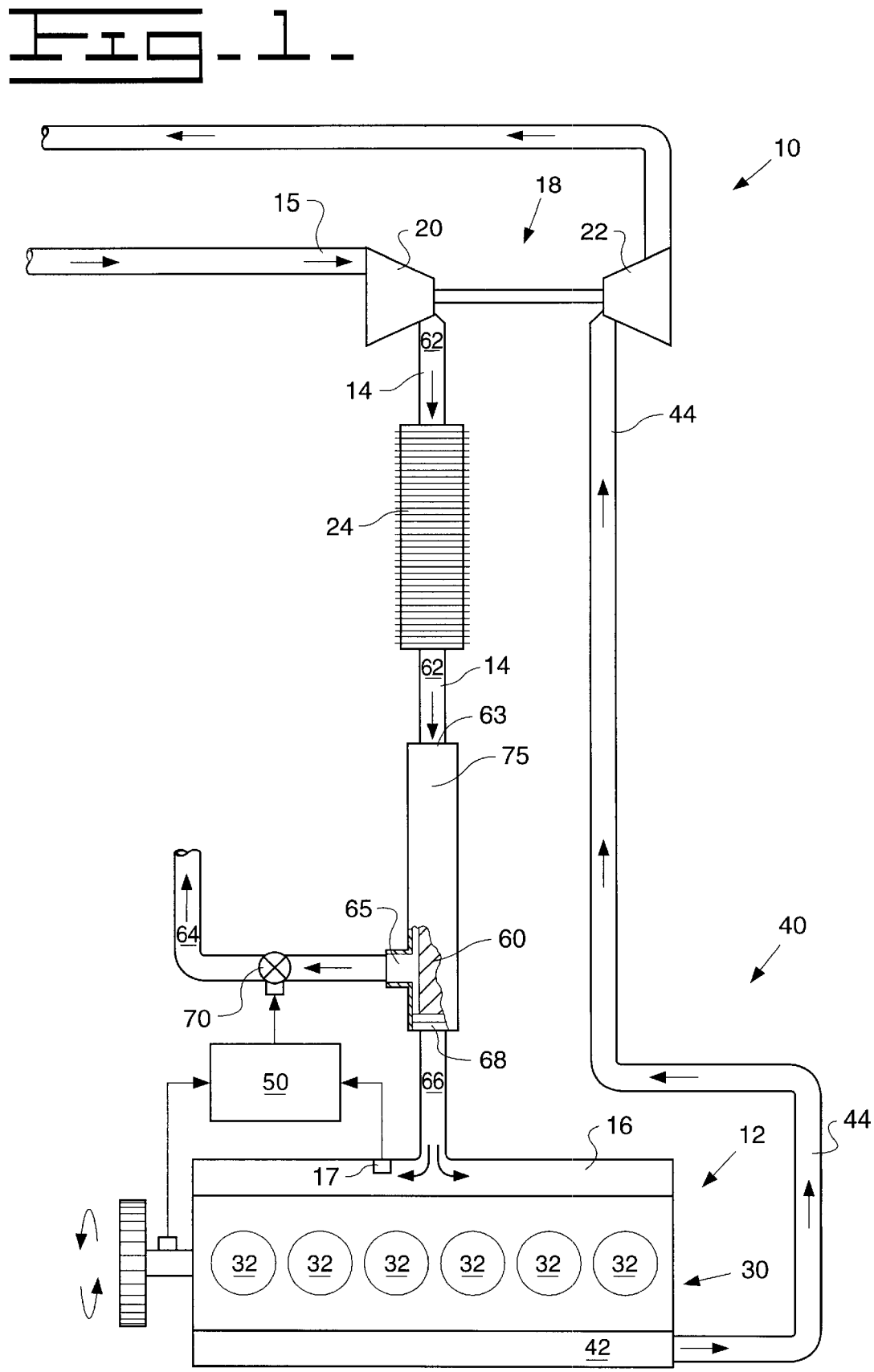
FIG. 1 depicts a schematic diagram of an internal combustion engine incorporating the intake air separation system in accordance with the present invention.

Turning now to the drawings and particularly FIG. 1, there is shown a schematic diagram of an intake air separation system 10 for a heavy-duty diesel engine 12. The intake side of the diesel engine 12 includes an intake air conduit 14, an intake manifold 16, intake air pressurizing device 18 (e.g. turbocharger), and an inter-cooler or an air to air aftercooler (ATAAC) 24. The engine 12 also includes a main combustion section 30, and an exhaust system 40. Although not shown in great detail, the typical main combustion section 30 includes, among other elements, an engine block and a cylinder head forming a plurality of combustion cylinders 32 therein. Associated with each of the cylinders 32 is a fuel injector, a cylinder liner, at least one air intake port and corresponding intake valves, at least one exhaust gas port and corresponding exhaust valves, and a reciprocating piston moveable within each cylinder to define, in conjunction with the cylinder liner and cylinder head, the combustion chamber. The exhaust system 40 of the diesel engine 12 includes an exhaust manifold 42 or split exhaust manifolds, one or more exhaust conduits 44, and an exhaust gas driven turbine 22, which drives the intake air compressor 20. Optionally, the exhaust system 40 may include one or more aftertreatment devices (not shown) such as particulate traps, NOx adsorbers, oxidation and/or lean NOx catalysts, or other recent advances in exhaust gas aftertreatment. Finally, the engine 12 includes an engine control module (ECM) 50 for operatively controlling the fuel injection timing and air system valve operations in response to one or more measured or sensed engine operating parameters, used as inputs to the ECM 50.

Although the present intake air separation system is shown and described with use on a heavy-duty six-cylinder, in-line, four stroke, direct injection diesel engine, numerous other engine types of engines, including alternate fuel engines, gasoline engines, natural gas engines, two stroke diesel engines, dual fuel engines, etc. are likewise contemplated as suitable engine platforms with which the disclosed invention may be used. In addition, the engine platform may come in a number of different engine configurations including "in-line"and "V"type engines and further having various numbers of cylinders.

As seen in FIG. 1, the intake air conduit 14 is in flow communication with intake air input 15, the compressor 20 of the exhaust gas driven turbocharger 18, and the ATAAC 24. Although the intake air separation system is shown and described in conjunction with a conventional turbocharged diesel engine, the disclosed system is equally useful on engines with a variable geometry turbocharger (VGT) or other supercharged engines, including engines with pressure wave supercharging devices. The intake manifold 16 is connected to an end of the intake air conduit 14. An inlet pressure sensor 17 is shown located somewhere in the intake air system (i.e. shown proximate the intake manifold 16) and provides intake air pressure data to the ECM 50. Other sensors such as temperature sensors, oxygen sensors (not shown) may also be incorporated within the intake air system and likewise coupled as inputs to the ECM 50. In addition, various other devices such as filters, valves, actuators, bypass conduits, etc., although not shown, may also be incorporated within the intake air system. Any such electronically operative components such as valves and/or actuators are preferably operatively coupled to the ECM 50 and operate in response to selected engine operating parameters or conditions, including engine speed, engine load, boost pressure conditions, etc.

The illustrated intake air separation system 10 includes an intake air separation device 60 disposed within the intake air system of the engine 12. Unlike the prior art separation systems, the intake air separation device 60 is adapted for receiving substantially all of the engine intake air at an air separation device inlet 63 and separating the same into a flow 64 of oxygen enriched air and a flow 66 of nitrogen enriched air. Intake air separation system 10 includes a first outlet 65 adapted to receive the permeate flow 64 of oxygen enriched air. The present embodiments are full flow separation systems, so there is no need for subsequent mixing of the enriched air flow exiting the retentate outlet with more intake air.

In addition, intake air separation system 10 includes a second outlet 68 adapted to receive the retentate flow 66 of nitrogen enriched air. As seen from FIGS. 1 and 3–5, the second outlet 68 is further in permanent, constant and unimpeded flow communication with the intake manifold 16 of the engine 12 thereby directing the retentate flow 55 solely and constantly toward the intake manifold 16. As seen in FIG. 1, a flow control device or proportional valve 70 is preferably disposed proximate the first outlet 65 adapted to receive the permeate flow 64 of oxygen enriched air. The flow control device 70 is preferably actuated in response to signals received from ECM 50 which controls the permeate flow 64 away from the intake air separation device 60 and thereby controls the oxygen content of the air flowing from the second outlet 68 to the engine intake manifold 16. In other words, the valve 70 located proximate the permeate flow outlet 66 controls both the flow of the oxygen enriched air or permeate flow 64 away from intake air separation device 60 and thus controls the concentration of nitrogen and oxygen in the air directed to the intake manifold 16 and into the combustion cylinders 32.

The location of the valve 70 is preferably at or proximate to permeate outlet 65 of the separation device housing or shell. Such an arrangement aids the responsiveness of the engine based on a relatively fast change in oxygen and nitrogen content of the air exiting the retentate outlet 68 into the intake manifold when the valve 70 is actuated (e.g. opened or closed) during transient operating conditions. Selective operation of the valve 70 allows the engine to operate in essentially three different charge air modes, namely nitrogen enriched mode (i.e. valve partially or fully open), standard intake air mode (i.e. valve closed for selected length of time), and transient oxygen enriched mode, which occurs for a short period or duration as the valve 70 is first closed. The exact location of the valve 70 is preferably optimized to take advantage of the different modes of charge air, and in particular the transient charge of oxygen enriched air that occurs when the valve 70 is first closed.

As seen in FIG. 1, the intake air separation device 60 preferably uses a plurality of selectively permeable separation membranes 75 that separates ambient intake air into streams of oxygen enriched air and nitrogen enriched air.

Such membranes 75 are well known in the art, as evidenced by the disclosures in U.S. Pat. No. 5,649,517 (Poola et al.); U.S. Pat. No. 5,526,641 (Sekar et al.); U.S. Pat. No. 5,640,845 (Ng et al.); and U.S. Pat. No. 5,147,417 (Nemser). See also K. Stork and R. Poola publication "Membrane-Based Air Composition Control for Light Duty Diesel Vehicles" (Oct. 19998) for a discussion on membrane materials and fabrication.

Figure 2:
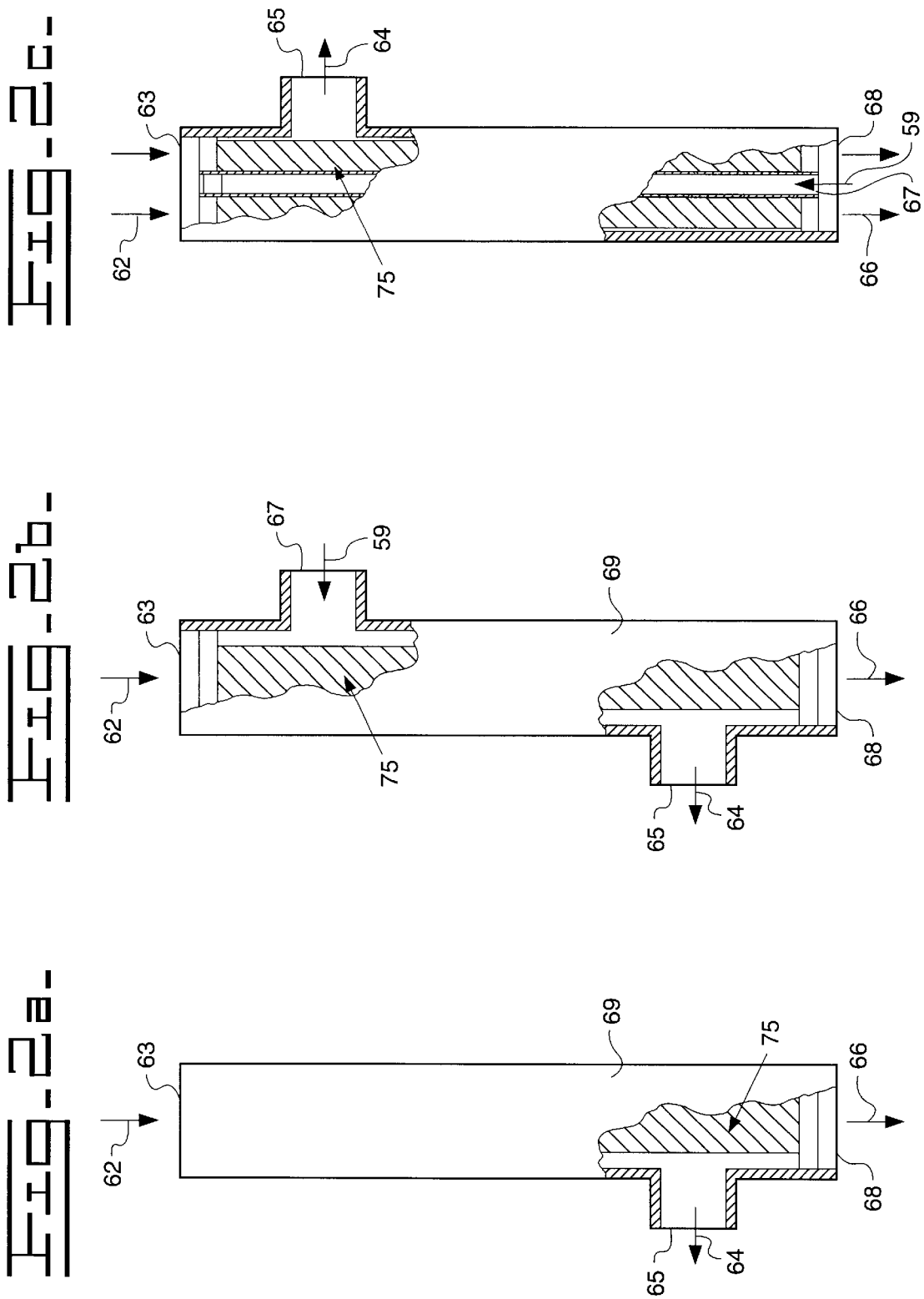
FIGS. 2a, 2b, and 2c depict partial cut-away diagrams of the air separation devices contemplated for use in the disclosed embodiments of the present intake air separation system.

Turning for a moment to FIG. 2a, there is shown an embodiment of the air separation membrane device 60. As seen therein, the air separation device 60 includes a housing or shell 69, having an intake air inlet 63, a permeate outlet 65, and a retentate outlet 68. A plurality of selectively permeable membranes 75 are disposed in a general longitudinal or helical (i.e. spiral) orientation within the housing 69 and potted or sealed at each end. The membranes 75 are preferably hollow, porous, coated tubes through which selected gases such as hydrogen, helium, water vapors, carbon dioxide, and oxygen tend to permeate outwardly through the membrane at a relatively fast rate while other gases, such as carbon monoxide, argon and nitrogen permeate less rapidly and are mostly retained and transported along the length of the membrane. Different gases in the feed air or intake air flow 62 permeate at different relative permeation rates through the side walls of the membranes. The result is a permeate flow 64 of oxygen rich air, exiting in a general lateral or radial direction from the membranes 75 and out via the permeate outlet 65, and a retentate flow 66 of nitrogen rich air, traversing in a general longitudinal direction through the membranes 75 and exiting via retentate outlet 68.

FIGS. 2b and 2c show alternate embodiments of the air separation membrane device 60. As with the embodiment of FIG. 2a, the air separation device 60 of FIGS. 2b and 2c also includes a housing 69, a plurality of selectively permeable membranes 75, an intake air inlet 63, a permeate outlet 65, and a retentate outlet 68. However, the embodiment of FIG. 2b also includes a purge air or sweep air inlet 67 (and associated hardware such as the purge conduit 55 and plug 57 of FIG. 2c) that is adapted to receive a flow of sweep air or purge air 59 which enhances the permeation effectiveness of the air separation device 60, as generally described in U.S. patent application Ser. No. 6,289,884 and the disclosure of which is incorporated by reference.

Referring back to the embodiment shown in FIG. 1, the compressor 20 of the turbocharger 18 is used to forcibly move intake air through the membrane based intake air separation device 60, in what is often referred to as the pressure mode. The feed air or intake air 62 is typically pressurized while the permeate flow 64 or oxygen enriched air flow exiting the membrane separation device 60 is preferably at a somewhat lower pressure. This pressure gradient across the membrane 75 enables the air separation to occur. As illustrated, the oxygen enriched air flow or permeate flow 64 is preferably vented to the atmosphere or otherwise fed to the exhaust system 40. The retentate flow 66 or nitrogen enriched air flow is fed to the intake manifold 16 in a generally pressurized condition, albeit at a lower pressure than the feed or intake air pressure due to losses caused by the membrane based air separation device 60.

Figure 3:
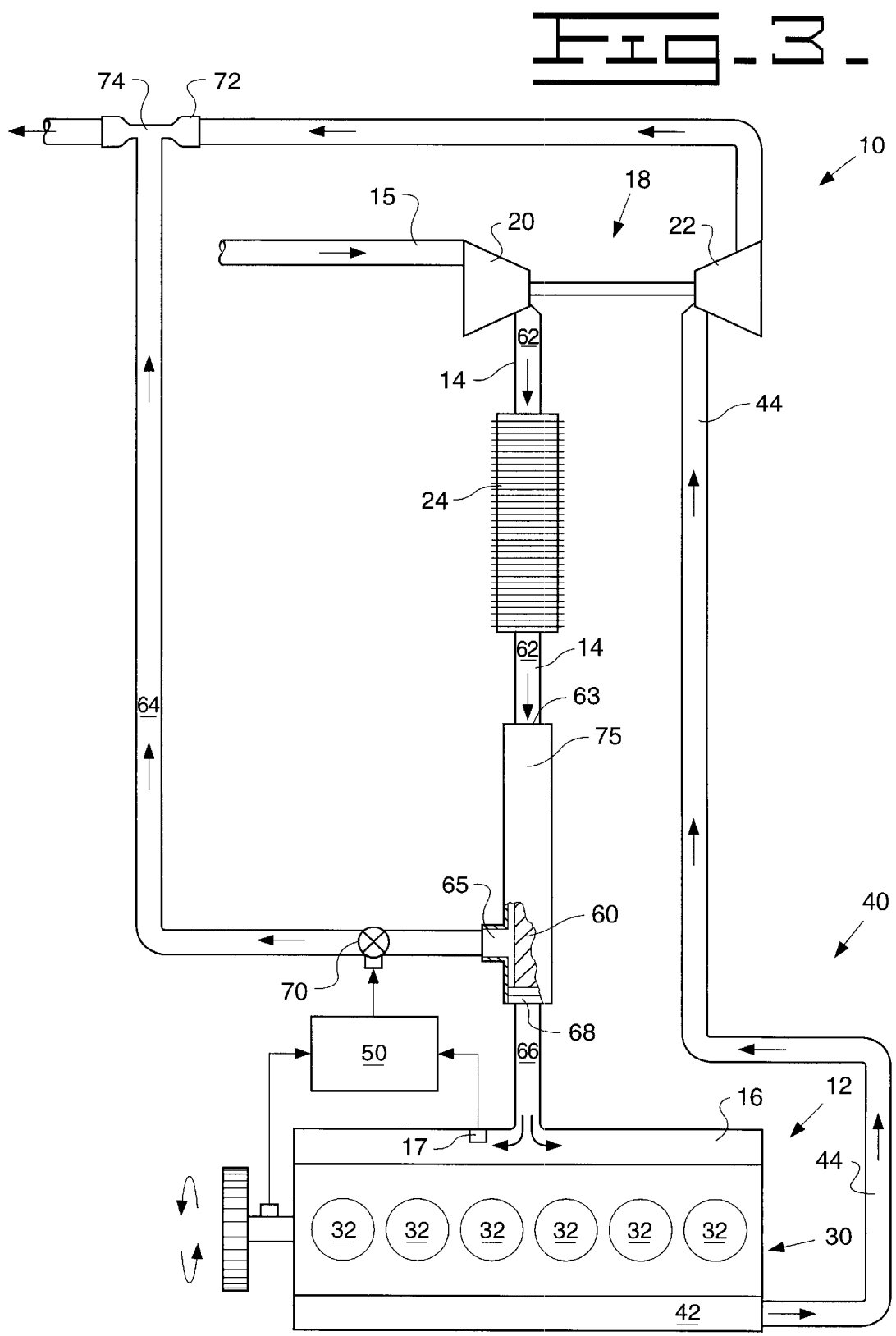
FIG. 3 depicts a schematic diagram of an alternate embodiment of the intake air separation system.

In certain light load operational environments, it may be necessary or desirable to provide an auxiliary force to drive the oxygen enriched air flow 66 from the air separation device 60. Conversely, in certain high load and/or transient load conditions, the oxygen demand of the engine 12 may warrant disabling the air separation effect. To accommodate these variations in flow requirements at different engine load conditions, the intake air separation system 10 may include a permeate air driver (See FIGS. 3–5) to drive the permeate air from the intake air separation device 60, or a permeate flow proportional valve 70 to restrict the permeate flow 66 away from the air separation system 10, or both. For example, an embodiment of the intake air separation system 10 shown in FIG. 3, provides an auxiliary drive force or permeate air driver may include a venturi element 72 placed in fluid communication with the permeate outlet 65 such that the flow of oxygen enriched air is forcibly drawn from the air separation device 60 to the throat 74 of the venturi element 72 via the permeate outlet 65 of the air separation device 60. As illustrated, the venturi element 72 can be placed in the exhaust stack or exhaust system 40 such that the flow of exhaust gases away from the engine 12 draws some or all of the oxygen enriched air away from the air separation device 60 for ultimate release to the atmosphere. One could also design the air separation system to use an auxiliary flow that is present at or near the engine (e.g. steam, waterjet, etc.) to draw the permeate flow. This would be particularly useful in stationary engine applications, such as co-generation applications, or electric power generation applications.

Figure 4:
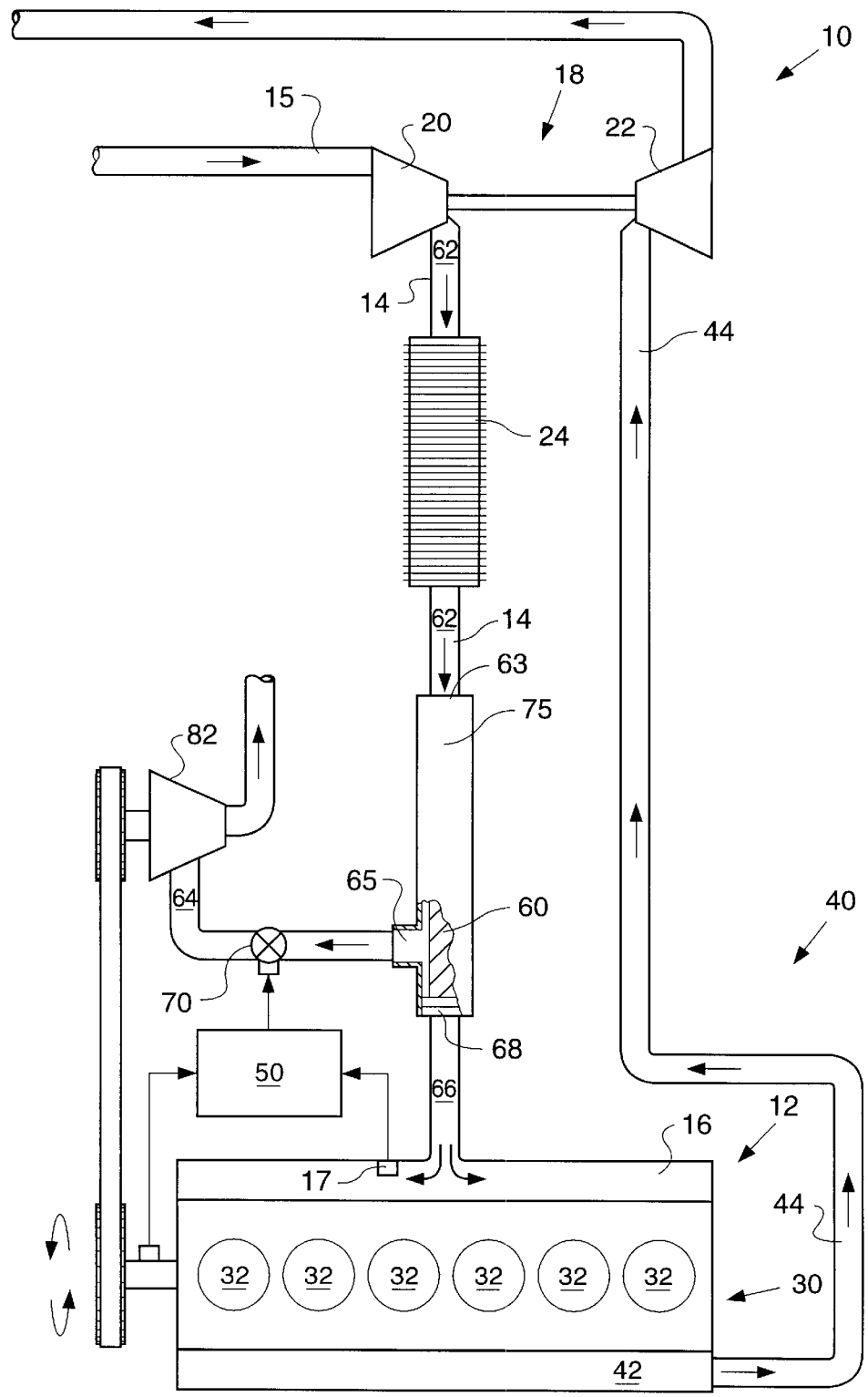
FIG. 4 depicts a schematic diagram of still another embodiment of the present intake air separation system.

Alternatively, the permeate drive force or permeate air driver is a pump 82, supercharger or other such device that is mechanically driven by the power output of the engine 12, as illustrated in FIG. 4. Likewise, an existing auxiliary power device, such as the hydraulic fuel injection pump or power steering pump unit, etc. can be used to drive a blower in the permeate air circuit. The pump 82 or other device is preferably placed in flow communication with the permeate outlet 65 and is operated such that some or all of the flow 64 of oxygen enriched air is forcibly drawn via permeate outlet 65 for disposal or other unidentified uses. As with the prior embodiment, the pump 82 or other auxiliary device is preferably controlled by the ECM 50 in response to one or more engine operating parameters or conditions, such as engine speed, engine load or intake pressure and/or temperature.

Figure 5:
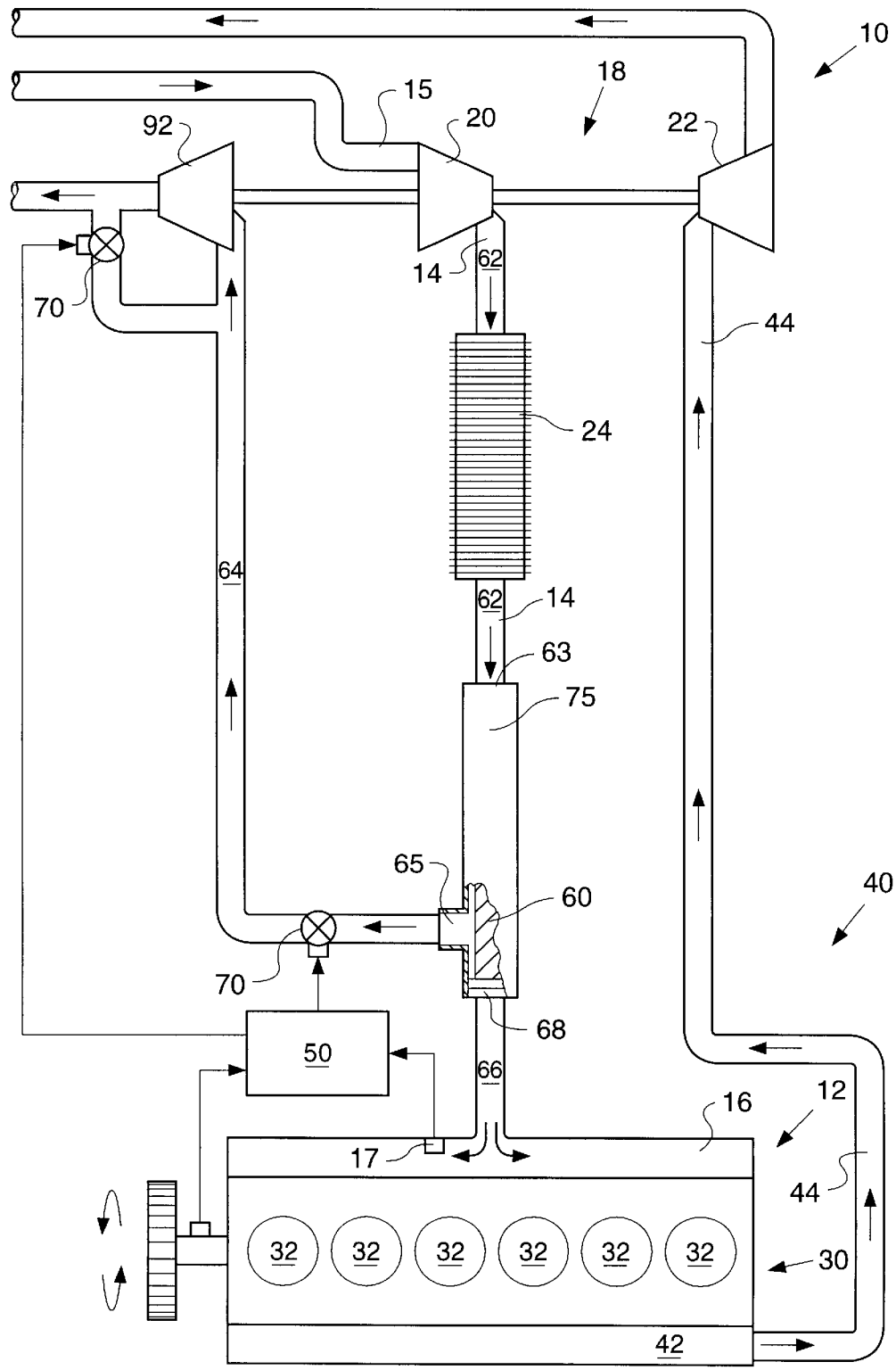
FIG. 5 depicts a schematic diagram of yet another embodiment of the present intake air separation system.

Still another embodiment of the intake air separation system 10 shown in FIG. 5, contemplates the use of an auxiliary drive force or permeate air driver such as a second compressor 92 associated with the turbocharger 18 that is driven by the exhaust gas driven turbine 22. As with other embodiments of the permeate air driver, the permeate compressor 92 would be disposed in flow communication with the permeate outlet 65 of the air separation device 60 and with selected oxygen enriched air dump locations. Preferably, the permeate compressor 92 would be operatively controlled such that the flow 64 of oxygen enriched air, including amount and flow rate, is forcibly drawn away from air separation device 60 in selected operating conditions.

Each of the above-described embodiments of the intake air separation system 10 also includes a permeate flow proportional valve 70. In order to accomplish the oxygen content modulation of the permeate flow 64 (oxygen enriched air) with the retentate flow 66 (nitrogen enriched air), a permeate flow proportional valve 70 or similar such flow control device is disposed proximate the permeate outlet 65 and is operatively controlled by the engine control module (ECM) 50.

The engine control module (ECM) 50 is thus adapted to control the flow of oxygen enriched air from the intake air separation device 60 by controlling both the permeate flow proportional valve 70 as well as any permeate driver (72, 82,92), if used. In doing so, the ECM 50 is effectively controlling the flow to the intake manifold 16 by controlling the oxygen and nitrogen content in the retentate flow 66 that is directed to the intake manifold 16 of the engine 12. The control of the permeate flow 64 and corresponding retentate flow 66 is preferably done in response to selected engine operating conditions, such as boost conditions, engine speed, engine temperatures, fuel rack (i.e. engine load), as well as other known inputs to the ECM 50. For example, during high load and transient engine operating conditions, the permeate flow proportional valve 70 is partially or completely closed which re-directs directs some or all of the permeate flow present in or near the air separation device to intake manifold 16 along with the retentate flow 66, which provides a temporary spike in oxygen content to the engine. By closing the permeate flow proportional valve 70 such that no permeate flow 64 exits the permeate outlet 65, the pressure gradient driving the permeate separation is in effect eliminated thereby minimizing the air separation effect and ultimately increasing the concentration of oxygen reaching the intake manifold 16 for use in the combustion process. In the same manner, partially closing the permeate proportional valve 70 or restricting the permeate flow 64 will affect the pressure gradient between the feed air or intake air flow 62 and the permeate outlet which, in turn affects the overall air separation function and thus alters or controls the oxygen and nitrogen concentration of air passed to the intake manifold 16.

Industrial Applicability

The preferred operation the above-described intake air separation system 10 and associated method of controlling such intake air separation system 10 includes the basic steps of: (a) directing substantially all of the intake air 62 to an intake air separating device; (b) separating said intake air into a flow of oxygen enriched air 64 and a flow of nitrogen enriched air 66; (c) directing the flow of nitrogen enriched air 66 to the engine intake manifold 16; and (d) controlling the nitrogen content and oxygen content of the air directed to the intake manifold 16 by controlling the flow of the oxygen enriched air 64 away from the intake air separation device 60 in response to selected engine operating conditions.

The step of controlling the nitrogen content and oxygen content of the combustion air is preferably controlled through the operation of the permeate control valve 70. For example, there exist one set of engine operating conditions where the permeate flow valve is open (i.e. air separation is active), and the natural pressure gradient or created pressure gradient across the membrane separation device 60 is sufficient to create the desired or necessary permeate and retentate flow volumes. On the other hand, there exist another set of engine operating conditions (e.g. transient engine operating conditions) where the purge valve is typically closed and/or the permeate flow valve is partially or completely closed (i.e. intake air separation is limited or totally disabled). In such operating conditions the absence of the purge flow and/or permeate flow inhibits the air separation function. The resulting air flow is directed out the retentate outlet to the intake manifold of the engine. Thus, through the selective control of the permeate valve, the concentration of oxygen and nitrogen in the air provided to the intake manifold is actively controlled.

As indicated above, the engine, as disclosed can operate in three different charge air modes, namely nitrogen enriched mode (nitrogen content between 79.5 and 82 percent), standard intake air mode (i.e. no air separation occurring), and a transient oxygen enriched mode (i.e. oxygen concentration spike). The cooperative control of such valves provides numerous control strategies suitable for use with the disclosed air intake separation systems, particularly where other uses of the retentate and permeate flows are contemplated.

Under either of the above-described engine operating conditions, the ECM 50 effectively controls the devices that govern the flows through the system, including the variable geometry turbocharger (VGT) and permeate air driver (72, 82,92), if such devices are used, and the proportional permeate valve 70, as well as any bypass valves and other auxiliary devices useful in such intake air separation system 10. Such devices are preferably controlled by the ECM 50 in response to certain measured or otherwise ascertained parameters such as intake and exhaust temperatures, mass air flow rates, oxygen concentrations, NOx levels, intake air pressures, engine speed and load.

From the foregoing, it can be seen that the disclosed invention is an intake air separation system for an internal combustion engine, such as a heavy-duty diesel engine, that includes an intake air separation device adapted to receive substantially all of the intake air flow and separate the same into flows of oxygen enriched air and nitrogen enriched air for specified uses. The intake air separation system also includes a permeate proportional valve in fluid communication with the intake air separation device that is adapted for controlling the resulting concentration of oxygen and nitrogen directed to the intake manifold. While the invention herein disclosed has been described by means of specific embodiments and processes associated therewith, numerous modifications and variations could be made thereto by those skilled in the art without departing from the scope of the invention as set forth in the claims.

What is claimed is:

1. An intake air separation system adapted for providing nitrogen enriched air for the combustion process within an internal combustion engine, said engine including an intake manifold, said intake air separation system comprising:

an intake air inlet adapted to receive substantially all of said intake air used in the combustion process for said engine;

an intake air separation device in flow communication with said intake air inlet and adapted for receiving substantially all of said intake air used in the combustion process for said engine and separating said intake air into a flow of said oxygen enriched air and a flow of nitrogen enriched air;

a permeate outlet in fluid communication with said intake air separation device and adapted to receive said flow of said oxygen enriched air; and a retentate outlet in constant fluid communication with said intake air separation device and said intake manifold, said retentate outlet adapted to constantly direct said flow of said nitrogen enriched air solely to said intake manifold for use in the combustion process;

a first flow control valve disposed proximate the permeate outlet, said flow control valve adapted for controlling said flow of oxygen enriched air from said intake air separation device via said permeate outlet, said first flow control valve thereby being adapted to selectively control a proportion of a permeate outlet flow of oxygen enriched air from said intake air separation device through said permeate outlet relative to a retentate outlet flow thereof through said retentate outlet;

an engine control module operatively coupled to said flow valve and adapted to control said permeate outlet flow of oxygen enriched air from said intake air separation device via said permeate outlet and the corresponding retentate outlet flow via said retentate outlet in response to selected engine operation conditions;

wherein the nitrogen content of said air provided to said intake manifold for use in the combustion process is varied solely via operation of said first flow control valve in response to selected engine operating conditions.

2. The intake air separation system of claim 1 wherein said intake air separation device is disposed downstream of an intake air pressure-charging device.

3. The intake air separation system of claim 1 wherein said intake air separation device is disposed downstream of an intake air-cooling device.

4. The intake air separation system of claim 1 wherein said intake air separation device further comprises a selectively permeable membrane device.

5. The intake air separation system of claim 4 wherein said intake air separation system further includes a permeate air driver in fluid communication with said selectively permeable membrane device and adapted for forcibly directing said flow of oxygen enriched air via said permeate outlet.

6. The intake air separation system of claim 5 wherein said permeate air driver is disposed in fluid communication with said permeate outlet and mechanically driven by the power output and engine, wherein said flow of oxygen enriched air is forcibly drawn via said permeate outlet.

7. The intake air separation system of claim 5 wherein said permeate air driver is disposed in fluid communication with said permeate outlet and driven by an auxiliary power device of said engine, wherein said flow of oxygen enriched air is forcibly drawn via said permeate outlet.

8. An intake air separation system adapted for providing nitrogen enriched air for the combustion process within an internal combustion engine, said intake air separation system comprising:

an intake air inlet adapted to receive substantially all of said intake air used in the combustion process for said engine;

an intake air separation device in flow communication with said intake air inlet and adapted for receiving substantially all of said intake air used in the combustion process for said engine and separating said intake air into a flow of said oxygen enriched air and a flow of nitrogen enriched air, said intake air separation device comprising a selectively permeable membrane device;

a permeate outlet in fluid communication with said intake air separation device and adapted to receive said flow of said oxygen enriched air; and a retentate outlet in fluid communication with said intake air separation device and said intake manifold, said retentate outlet adapted to provide said flow of said nitrogen enriched air to said intake manifold for use in the combustion process, a first flow control device disposed proximate the permeate outlet, said flow control device adapted for controlling said flow of oxygen enriched air from said intake air separation device via said permeate outlet;

a permeate air driver in fluid communication with said selectively permeable membrane device and adapted for forcibly directing said flow of oxygen enriched air via said permeate outlet; said permeate air driver being a venturi element placed in fluid communication with said permeate outlet, wherein said flow of oxygen enriched air is forcibly drawn to said venturi element via said permeate outlet; and an engine control module operatively coupled to said flow control device and adapted to control said flow of oxygen enriched air from said intake air separation device via said permeate outlet and the corresponding flow via said retentate outlet in response to selected engine operating conditions;

wherein the nitrogen content of said air provided to said intake manifold for use in the combustion process is varied in response to selected engine operating conditions.

9. An intake air separation system adapted for providing nitrogen enriched air for the combustion process within an internal combustion engine, said intake air separation system comprising:

an intake air inlet adapted to receive substantially all of said intake air used in the combustion process for said engine;

an intake air separation device in flow communication with said intake air inlet and adapted for receiving substantially all of said intake air used in the combustion process for said engine and separating said intake air into a flow of said oxygen enriched air and a flow of nitrogen enriched air, said intake air separation device comprising a selectively permeable membrane device;

a permeate outlet in fluid communication with said intake air separation device and adapted to receive said flow of said oxygen enriched air; and a retentate outlet in fluid communication with said intake air separation device and said intake manifold, said retentate outlet adapted to provide said flow of said nitrogen enriched air to said intake manifold for use in the combustion process;

a first flow control device disposed proximate the permeate outlet, said flow control device adapted for controlling said flow of oxygen enriched air from said intake air separation device via said permeate outlet;

a permeate air driver in fluid communication with said selectively permeable membrane device and adapted for forcibly directing said flow of oxygen enriched air via said permeate outlet; said permeate air driver being disposed in fluid communication with said permeate outlet and driven by an exhaust gas driven turbine of said engine, wherein said flow of oxygen enriched air is forcibly drawn via said permeate outlet; and an engine control module operatively coupled to said flow control device and adapted to control said flow of oxygen enriched air from said intake air separation device via said permeate outlet and the corresponding flow via said retentate outlet in response to selected engine operating conditions;

wherein the nitrogen content of said air provided to said intake manifold for use in the combustion process is varied in response to selected engine operating conditions.

10. A method of controlling the intake airflow in an internal combustion engine, said engine having an intake air system adapted for providing intake air to an intake manifold and one or more combustion chambers, said method comprising the steps of:

directing substantially all of said intake air to an intake air separating device;

separating said intake air into a flow of oxygen enriched air and a flow of nitrogen enriched air;

directing said nitrogen enriched air directly, constantly and solely into said intake manifold; and controlling the nitrogen content of said air directed into said intake manifold solely by controlling a proportion of said oxygen enriched air permitted to flow towards said intake manifold in response to selected engine operating conditions.

11. The method of claim 10 wherein the step of separating substantially all of said intake air into a flow of oxygen enriched air and a flow of nitrogen enriched air further comprises passing substantially all of said intake air through a selectively permeable membrane adapted for separating said intake air to producing oxygen enriched air at a first outlet and nitrogen enriched air at a second outlet.

12. The method of claim 10 further comprising the step of pressurizing said intake air prior to the step of directing substantially all of said intake air to said intake air separating device.

13. The method of claim 10 further comprising the step of cooling said intake air prior to the step of directing substantially all of said intake air to said intake air separating device.

* * * * *

UNITED STATES PATENT AND TRADEMARK OFFICE
CERTIFICATE OF CORRECTION

PATENT NO. : 6,453,893 B1
DATED : September 24, 2002
INVENTOR(S) : Gerald N. Coleman et al.

It is certified that error appears in the above-identified patent and that said Letters Patent is hereby corrected as shown below:

Column 10,
Line 25, delete "and" and insert -- of said --.

Signed and Sealed this

Twenty-eighth Day of January, 2003

JAMES E. ROGAN
*Director of the United States Patent and Trademark Office*